UNITED STATES PATENT OFFICE.

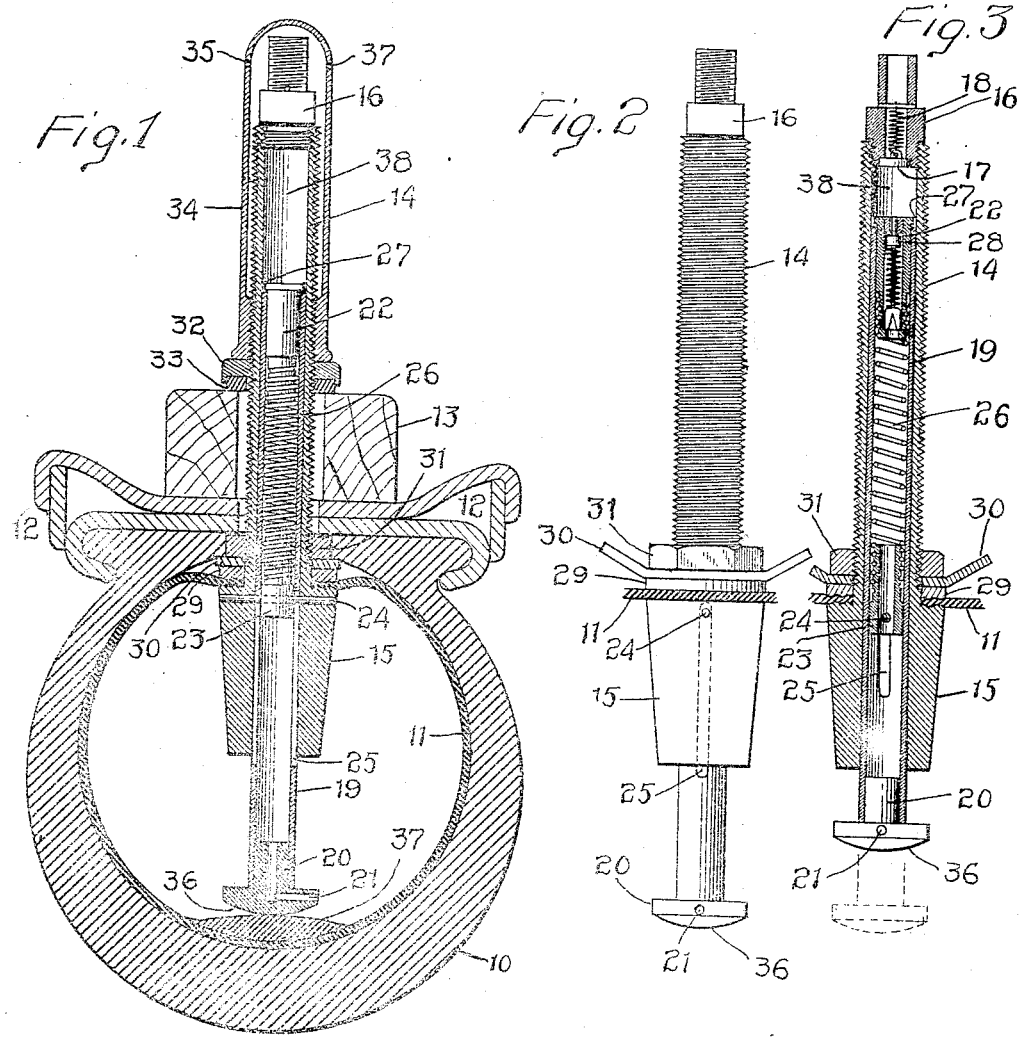
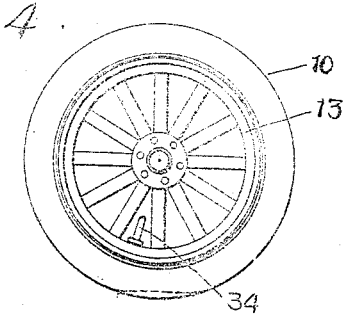

FRANK C. CRAW, OF SOUTH NORWALK, CONNECTICUT.

AUTOMATIC TIRE-PUMP.

1,132,137.

Specification of Letters Patent. Patented Mar. 16, 1915.

Application filed August 13, 1913. Serial No. 784,561.

*To all whom it may concern:*

Be it known that I, FRANK C. CRAW, a citizen of the United States, residing at South Norwalk, county of Fairfield, State of Connecticut, have invented an Improvement in Automatic Tire-Pumps, of which the following is a specification.

This invention has for its object to provide a tire pump especially adapted for automobiles, which while the vehicle is in use will automatically keep a tire pumped up to a predetermined pressure. With this end in view I have devised the novel pump which I will now describe, referring to the accompanying drawing forming a part of this specification and using reference characters to indicate the several parts.

Figure 1 is a transverse section of a pneumatic tire and a longitudinal section of my novel pump applied thereto, parts of the pump appearing in elevation; Fig. 2 an elevation of the pump detached as seen from the right in Fig. 1, the cap being removed and an inner tube appearing in section; Fig. 3 a complete longitudinal section of the pump, and Fig. 4 is an elevation on a reduced scale of a pneumatic wheel showing the nozzle of the pump.

The invention is equally applicable to hose pipe or inner tube tires, and is illustrated in connection with the latter type.

10 denotes the shoe and 11 the inner tube of a pneumatic tire, and 12 the parts of the rim and 13 the felly of an automobile wheel.

14 denotes the body of my novel pump, which is externally threaded, is provided within the tire with a head 15 and the outer end of which is closed by a screw plug 16 having a longitudinal hole and an external thread for the attachment of a pump tube for inflating the tire. The inner end of the screw plug is closed by a valve 17, controlled by a spring 18, which yields to permit air to be forced into the tire but prevents its escape therefrom.

19 denotes a tubular piston which is adapted to reciprocate in the body and the head, the inner end of which is closed by a plug 20 having an air hole 21 and the outer end of which is closed by a hollow plug 22.

23 denotes a stationary plug lying within the tubular piston and secured in place by means of a pin 24 which passes through holes in head 15 and through slots 25 in the tubular piston, thus permitting free reciprocatory movement of the piston. The inner ends of plugs 22 and 23 are shown as reduced and threaded for engagement by a spring 26, the action of which is to return the piston from the full line position in Fig. 3 to the dotted position in said view, corresponding with the full line position in Figs. 1 and 2. At the inner end of the piston surrounding the head of plug 22 is a packing washer 27. Within plug 22 is an ordinary spring controlled tire valve, which is indicated as a whole by 28. This valve is not described in detail as specifically it forms no portion of the present invention.

The tire or inner tube is secured to the body of the pump in any ordinary or preferred manner as by inserting the head through a hole in the tube and clamping the material of the tube surrounding the hole between a shoulder on the head and a washer 29. Outside this washer there is usually placed a plate 30 having upturned ends which lie in the slot in the shoe and retain the body against rotation. This plate is retained rigidly in place by a nut 31 between which and the shoulder on the head the plate, washer and tire are clamped. The body is secured to the wheel by means of a nut 32 which is screwed down tightly upon the inner periphery of the felly or upon a washer 33, interposed between the nut and the felly.

34 is a screw cap which covers the entire outer end of the body and is provided with holes 35 for the admission of air.

Plug 20 at the inner end of the piston is provided with a rounded head 36 which, when the tire is soft enough to be flattened by engagement with the ground at each rotation of the wheel, will be engaged by the inner wall of the tube and the pump will thereby be operated. In order to prevent the possibility of wear upon the inner tube I preferably provide on the inner side thereof a rounded hump or projection 37 which is adapted to engage the rounded head of the piston when the tire is flattened by engagement with the ground.

The operation is as follows: The tire is inflated by means of any ordinary pump in the usual manner, the object of my novel automatic pump not being to inflate the tire in the first instance but to maintain a predetermined pressure within the tire after it has once been inflated. In order to accomplish this result it is necessary that spring 26 should be graduated to correspond with the required pressure within the tire. For example, suppose the required pressure to be seventy-five pounds; spring 26 should be of sufficient strength to resist a pressure of seventy-five pounds and retain the piston in the position shown in Figs. 1 and 2. Should the pressure within the tire exceed seventy-five pounds, however, this pressure will overcome the resistance of the spring and raise the piston as in Fig. 3 so that it will not be engaged by the tire or the hump thereon when the portion of the tire contiguous to plug 20 is flattened by engagement with the ground at each rotation of the wheel. In inflating the tire in the first instance, by attaching a pump tube to screw plug 16, valve 17 will open and permit air to pass freely into the body and valve 28 in the piston will also operate to permit air to pass in the usual manner, both valves closing the instant the inward pressure is relieved, to prevent the escape of air.

Suppose now that the pressure within the tire drops below the predetermined maximum pressure, spring 26 will act to draw the piston downward from the full line position in Fig. 3 to the dotted position, which corresponds with the full line position in Figs. 1 and 2. As soon as the tire becomes sufficiently softened so that the portion bearing upon the ground will be flattened, the effect will be to actuate the piston and to compress the air in the chamber 38 in the body between screw plug 16 and the end of the piston. The compression of air in chamber 38 will overcome the resistance of valve 28 in the piston and air from the chamber will pass through said valve and through the piston and out into the tire either through slots 25 or through air hole 21. As soon as the pressure in the chamber is relieved, valve 17 in screw plug 16 will yield and let in air which will enter through air holes 35 in cap 34. As soon as the pressure within the tire equals the pressure in the chamber or as soon as the rotation of the wheel causes another actuation of the piston, valves 17 and 28 will close again and the air that has entered through valve 17 will be compressed in the chamber and will pass through the piston and into the tire, these operations being repeated so long as the pressure within the tire is below the predetermined pressure to which spring 26 is graduated. When the predetermined pressure is reached, the piston will be again raised as in Fig. 3 and the pump will be automatically thrown out of operation, but the instant that the pressure within the tire again falls below the predetermined maximum to which spring 26 has been graduated, the pump will again be automatically thrown into operation, as described, and outside air will be pumped in to supply the loss by leakage.

Having thus described my invention I claim:

1. A pump of the character described comprising a body having at one end a head adapted for attachment to a tire and to lie within the tire, and at its other end an inwardly operating valve, a tubular piston having at one end a head adapted to engage the wall of a tire and at its other end an inwardly operating valve, a stationary plug within the piston and secured to the body and a spring within the piston and connected to the stationary plug and to the piston, said spring acting to retain the head of the piston in engagement with the wall of the tire until the pressure within the tire overcomes the strength of the spring when the piston will be raised out of engagement with the tire.

2. A pump of the character described comprising a body having at one end a head adapted to lie within a tire and at its other end an inwardly operating valve, a tubular piston having slots and at one end a head adapted to engage the wall of a tire and at its other end an inwardly operating valve, a stationary plug within the piston, a pin passing through the slots and attaching the plug to the body and a spring connected to the plug and to the piston.

3. A pump of the character described comprising a body adapted for attachment to a tire and having at its outer end a plug with a longitudinal hole and an inwardly operating valve, a tubular piston having at its outer end a hollow plug with an inwardly operating valve, a stationary plug within the piston and secured to the body and a spring connected to the stationary plug and to the plug in the end of the piston.

4. The combination with a tire, a pump body having a head within the tire and an inwardly operating valve at the outer end of the body, of a tubular piston having an inwardly operating valve, a stationary plug within the piston and secured to the body and a spring connected to the stationary plug and to the piston.

5. The combination with a tire and a pump body having a head within the tire and an inwardly operating valve at its outer end, of a tubular piston having an inwardly operating valve and a head adapted to engage the tire, a stationary plug within the piston, means for securing the plug to the body leaving the piston free to reciprocate and a spring connected to the plug and to the piston.

In testimony whereof I affix my signature in presence of two witnesses.

FRANK C. CRAW.

Witnesses:
S. W. ATHERTON,
A. M. WOOSTER.